United States Patent
Basini et al.

(10) Patent No.: US 9,630,168 B2
(45) Date of Patent: Apr. 25, 2017

(54) CATALYTIC SYSTEM FOR CATALYTIC PARTIAL OXIDATION PROCESSES WITH A SHORT CONTACT TIME

(75) Inventors: Luca Eugenio Basini, Milan (IT); Alessandra Guarinoni, Piacenza (IT); Luciano Cosimo Carluccio, San Donato Milanese (IT)

(73) Assignee: ENI S.p.A., Rome (IT)

( * ) Notice: Subject to any disclaimer, the term of this patent is extended or adjusted under 35 U.S.C. 154(b) by 197 days.

(21) Appl. No.: 13/701,593

(22) PCT Filed: May 31, 2011

(86) PCT No.: PCT/EP2011/002751
§ 371 (c)(1),
(2), (4) Date: Jan. 30, 2013

(87) PCT Pub. No.: WO2011/151082
PCT Pub. Date: Dec. 8, 2011

(65) Prior Publication Data
US 2013/0129609 A1    May 23, 2013

(30) Foreign Application Priority Data
Jun. 3, 2010 (IT) .............................. MI2010A1001

(51) Int. Cl.
*B01J 23/00* (2006.01)
*B01J 23/89* (2006.01)
(Continued)

(52) U.S. Cl.
CPC .............. *B01J 23/892* (2013.01); *B01J 8/048* (2013.01); *B01J 19/2485* (2013.01);
(Continued)

(58) Field of Classification Search
CPC ........ B01J 23/892; B01J 35/023; B01J 37/08; B01J 37/0201; B01J 35/0006; B01J 23/40;
(Continued)

(56) References Cited

U.S. PATENT DOCUMENTS 6,190,623 B1   2/2001  Sanger et al.
2004/0241509 A1  12/2004  Taguchi et al.
(Continued)

FOREIGN PATENT DOCUMENTS

EP   0 892 760    5/2000
EP   1 479 650   11/2004
(Continued)

OTHER PUBLICATIONS

Office Action issued May 27, 2014 in European Patent Application No. 11 723 886.5.
(Continued)

*Primary Examiner* — Colleen Dunn
*Assistant Examiner* — Haytham Soliman
(74) *Attorney, Agent, or Firm* — Oblon, McClelland, Maier & Neustadt, L.L.P.

(57) ABSTRACT

The present invention relates to a catalytic system comprising at least two catalytic zones of which at least one zone exclusively contains one or more noble metals selected from the group consisting of Rhodium, Ruthenium, Iridium, Palladium and Platinum and at least another zone contains Nickel, said catalytic system characterized in that at least one zone exclusively containing noble metals selected from the group consisting of Rhodium, Ruthenium, Iridium, Palladium and Platinum is always distinct but in contact with at least one zone containing Nickel. One or more metals selected from the group consisting of Rhodium, Ruthenium,
(Continued)

Figure 1:
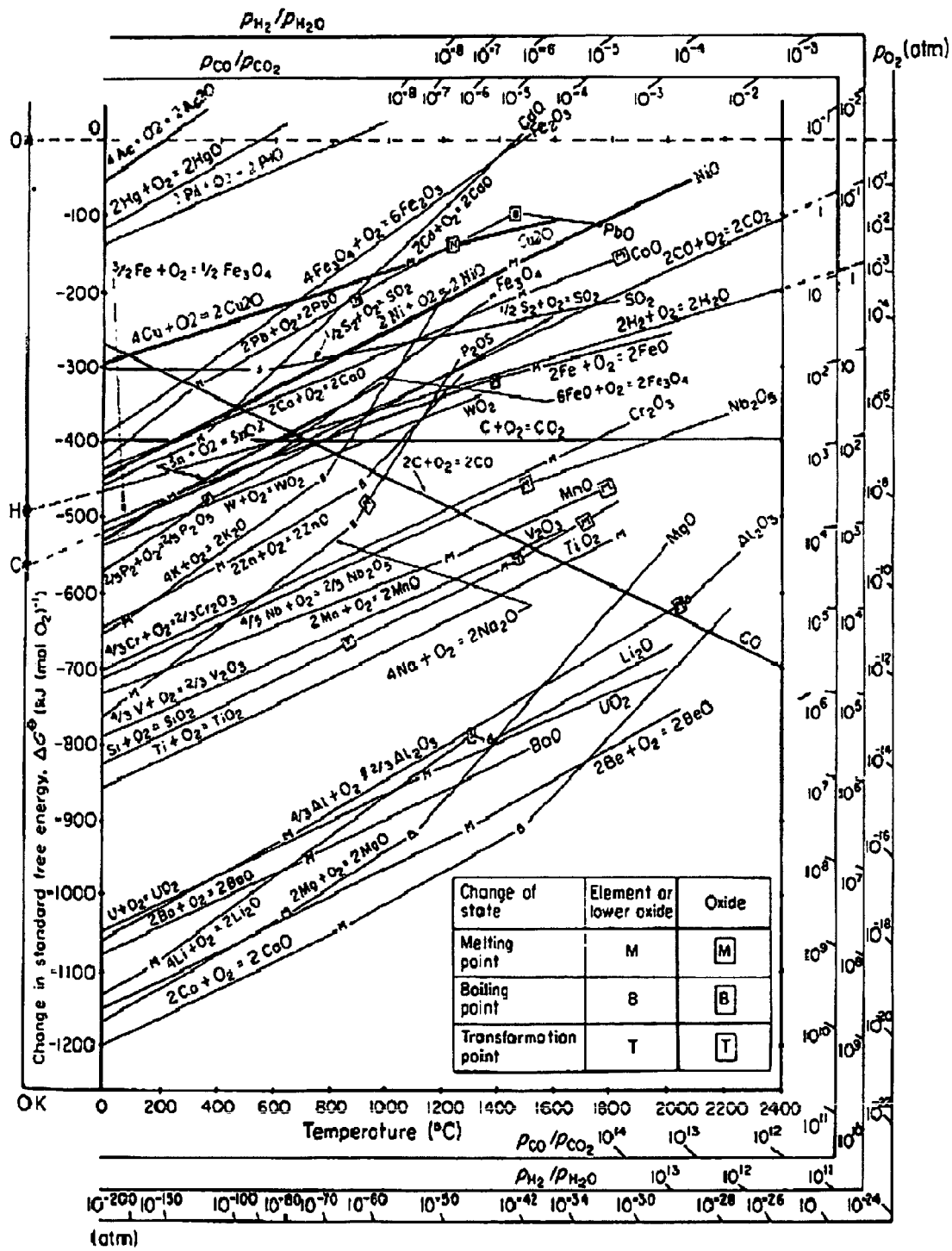

Iridium, Palladium and Platinum are possibly added to the catalytic zone or zones comprising Nickel.

18 Claims, 6 Drawing Sheets

(51) Int. Cl.
| | |
|---|---|
| *B01J 8/04* | (2006.01) |
| *B01J 19/24* | (2006.01) |
| *C01B 3/38* | (2006.01) |
| *C01B 3/40* | (2006.01) |
| *B01J 23/40* | (2006.01) |
| *B01J 37/08* | (2006.01) |
| *B01J 35/00* | (2006.01) |
| *B01J 35/02* | (2006.01) |
| *B01J 37/02* | (2006.01) |
| *B01J 21/04* | (2006.01) |

(52) U.S. Cl.
CPC ........... *B01J 19/2495* (2013.01); *B01J 23/40* (2013.01); *B01J 35/0006* (2013.01); *B01J 35/023* (2013.01); *B01J 37/0201* (2013.01); *B01J 37/08* (2013.01); *C01B 3/382* (2013.01); *C01B 3/386* (2013.01); *C01B 3/40* (2013.01); *B01J 21/04* (2013.01); *B01J 2208/00061* (2013.01); *B01J 2208/00495* (2013.01); *B01J 2208/00539* (2013.01); *B01J 2208/00849* (2013.01); *B01J 2208/025* (2013.01); *B01J 2219/2422* (2013.01); *B01J 2219/2428* (2013.01); *B01J 2219/2434* (2013.01); *C01B 2203/0261* (2013.01); *C01B 2203/107* (2013.01); *C01B 2203/1011* (2013.01); *C01B 2203/1058* (2013.01); *C01B 2203/1064* (2013.01); *C01B 2203/1247* (2013.01); *Y02P 20/52* (2015.11)

(58) Field of Classification Search
CPC .... B01J 8/048; B01J 19/2485; B01J 19/2495; B01J 21/04; B01J 2208/00539; B01J 2208/00495; B01J 2219/2422; B01J 2208/025; B01J 2208/00061; B01J 2208/00849; B01J 2219/2428; B01J 2219/2434; C01B 3/382; C01B 3/40; C01B 3/386; C01B 2203/0261; C01B 2203/1247; C01B 2203/107; C01B 2203/1011; C01B 2203/1064; C01B 2203/1058
USPC ................................ 502/327, 325; 423/654
See application file for complete search history.

(56) References Cited

U.S. PATENT DOCUMENTS

| | | |
|---|---|---|
| 2006/0013762 A1 | 1/2006 | Kuipers et al. |
| 2006/0090398 A1 | 5/2006 | Katikaneni et al. |
| 2009/0026420 A1* | 1/2009 | Xu ................................ 252/373 |
| 2009/0035192 A1 | 2/2009 | Hwang |
| 2010/0294994 A1 | 11/2010 | Basini et al. |
| 2011/0192085 A1 | 8/2011 | Katikaneni et al. |

FOREIGN PATENT DOCUMENTS

| | | |
|---|---|---|
| EP | 1 181 241 B1 | 8/2005 |
| RU | 2 175 636 C2 | 11/2001 |
| WO | 2009 065559 | 5/2009 |

OTHER PUBLICATIONS

International Search Report Issued Oct. 31, 2011 in PCT/EP11/02751 filed May 31, 2011.
Office Action issued Feb. 3, 2015 in Russian Patent Application No. 2012151957/05(082867) (with English language translation).

* cited by examiner

CATALYTIC SYSTEM FOR CATALYTIC PARTIAL OXIDATION PROCESSES WITH A SHORT CONTACT TIME

CROSS REFERENCE TO RELATED APPLICATION

This application is a 371 of PCT/EP2011/002751, filed on May 31, 2011.

DESCRIPTION

The present invention relates to a catalytic system suitable for short-contact-time catalytic partial oxidation processes, for the production of synthesis gas and possibly hydrogen with further passages, starting from:
  i) gaseous and/or liquid hydrocarbons at the inlet temperature and pressure of the reaction equipment,
  ii) and/or oxygenated compounds deriving from biomasses,
  iii) air or enriched air or oxygen and/or water vapour and/or $CO_2$.

Short-contact-time catalytic partial oxidation processes (SCT-CPO) have been widely described by the applicant, for example in patents MI93A001857, MI96A00690, MI2003A001739, MI2004A001860, MI2007A002209, MI2007A002228. This process uses a hydrocarbon feedstock, an oxygen source and possibly water vapour and $CO_2$ for producing, after passage on a catalytic bed, Synthesis Gas and possibly, after suitable passages in other sections, hydrogen. The applications of the technology are consequently all those of processes via Synthesis Gas (for example the synthesis of $CH_3OH$ and its derivatives, the synthesis of $NH_3$ and its derivatives, the Fischer-Tropsch synthesis, hydroformylations, the reduction of ferrous minerals), and hydrogen production processes. With respect to the latter, in particular, it should be noted that the demand for hydrogen in refineries has an increasing trend, due to the necessity of treating increasingly heavy feedstocks and obtaining higher-quality products.

The technical advantages deriving from the use of the SCT-CPO technology with respect to Steam Reforming (SR), Autothermal Reforming (ATR), Non-catalytic Partial Oxidation (POx) technologies, are known. Furthermore, the SCT-CPO technology is characterized by operative simplicity, the possibility of widely varying its production capacity, and having flexibility in the composition of the feedstock, characteristics which are appreciated in the context of refineries. The capacity and quality of the hydrocarbons produced by refining and upgrading operations can in fact undergo a time evolution which can have cyclic characteristics in the various periods of the year.

To ensure that the SCT-CPO technology offers an effective competitive advantage, the catalyst used must have a high activity, which implies high conversions of the hydrocarbon and/or oxygenated feedstock, high selectivities towards the products of interest and a low affinity with reactions which lead to the formation of unsaturated compounds, precursors of carbonaceous residues. Among unsaturated compounds, the applicant cites volatile organic compounds (VOC) and semi-volatile organic compounds (SVOC). The latter group comprises Polycyclic Aromatic Hydrocarbons (PAH), defined as aromatic compounds consisting of two or more condensed rings, whose main groups are indicated in Table 1.

TABLE 1

| PAH groups |
|---|
| PAH Benzenoids |
| Naphthalene |
| Phenanthrene |
| Anthracene |
| Benzo(a)anthracene |
| Benzo(a)pyrene |
| Benzo(b)fluoranthene |
| Benzo(g,h,i)perylene |
| Benzo(k)fluoranthene |
| Chrisene |
| Fluoranthene |
| Fluorene |
| Indeno(1,2,3-cd)pyrene |
| Benzo(b)fluoranthene |
| Benzo(g,h,i)perylene |
| Benzo(k)fluoranthene |
| Acenaphthene |
| Acenaphthylene |
| PAH Methyl-substituted |
| 1-Methylnaphthalene |
| 2-Methylnaphthalene |

It is commonly accepted that the formation mechanism of PAHs passes through the formation of unsaturated compounds such as acetylene, which in turn derives from the presence of ethylene. The reaction mechanism (as described in Frencklach et al., Twentieth Symposium on Combustion, The Combustion Institute, Pittsburgh, Pa., 1984, page 887) involves first of all the formation of an aromatic ring from non-aromatic species, the subsequent growth of planar polycyclic aromatic hydrocarbons through an elimination mechanism of a hydrogen atom and the addition of $C_2H_2$, nucleation via coalescence of the PAHs and their subsequent growth via coagulation or via surface reaction between particles and clusters in formation.

The phenomenon becomes even more relevant at high pressure, as under these conditions, larger quantities of ethylene are produced, which is responsible for the surface growth phases and nucleation of soot particles. Systematic studies performed on a pilot scale level of SCT-CPO reactions have demonstrated that there is a correlation between the formation of PAHs and the operative conditions: the more the latter approach conditions of industrial interest, high pressure and high space velocities, the greater the formation of PAHs will be. More specifically under pressure conditions higher than 15 atm the presence of PAHs has been revealed which, even if in modest amounts (the maximum concentration revealed is about 10 ppm), is potentially harmful due to possible accumulation effects with time. In fact, carbonaceous compounds and/or soot deposits, can cause fouling and/or occlusion phenomena:
  1. in the catalyst used for the production of synthesis gas,
  2. in the catalyst used in the Water Gas Shift section,
  3. in all the equipments positioned downstream of the SCT-CPO section, for example the heat exchangers used for cooling the Synthesis Gas.

These phenomena initially cause a lower efficiency of the SCT-CPO process, but as the reaction proceeds, they can cause anti-economical shut-downs of the plant. In particular the Water Gas Shift catalysts are deactivated in the presence of minimum quantities of soot. Furthermore, it is known from experimental evidence that PAHs can form a film inside the tubes in which the cooling of the effluent takes place. The thermal exchange coefficients are thus reduced, the gas produced is no longer effectively cooled and overheated areas are formed which can damage the surfaces of the heat exchangers.

Various methods are known in the state of the art for solving the above mentioned technical problems, which, by reducing the concentration of ethylene and unsaturated compounds in general, contribute to reducing the formation of PAHs.

The main technical solution adopted in the known art for preventing the formation of unsaturated compounds, precursors of carbonaceous residues, is the use of high quantities of steam together with the reagent streams. In this way, however, a synthesis gas is obtained, which is characterized by a very high $H_2/CO$ ratio (higher than 2.00 v/v), which is not optimum for all the applications downstream the synthesis gas production reactor, for example the Fischer-Tropsch synthesis.

U.S. Pat. No. 7,226,548 B2 claims a catalyst consisting of high-melting alloys based on Rhodium and, preferably, Iridium or Ruthenium. On the basis of our experience, with said catalysts, the concentration of unsaturated molecules is not diminished and their concentration is not lower than that obtainable with a catalyst consisting of Rhodium alone.

Patent US 2004/0005270 A1 claims a catalyst containing Nickel supported on refractory oxide and stabilized with a metal, preferably Gold. In this case, the conversion and selectivity values are lower than those obtainable with a monometallic Rhodium-based catalyst. Nickel, in fact, is not stable in an oxidizing environment, as shown in the Ellingham diagram indicated in FIG. 1, which demonstrates how, for the whole range from 0° C. to the melting point of metallic Nickel, the formation of Nickel oxide is thermodynamically favoured. Furthermore, the use of Nickel-based compounds in the presence of Oxygen creates safety problems in the charging and discharging operations of the catalysts, as Nickel oxide is carcinogenic.

In U.S. Pat. No. 6,878,667 B2, a catalytic bed was used, consisting of a single bimetallic catalyst, preferably based on a Rhodium-Nickel alloy and possibly a lanthanide. This solution, however, is not effective as Rhodium-Nickel alloys, due to the presence of the latter element (Ni) which is characterized by a low melting point (Table 2), like all Ni-based catalysts, are not stable in an oxidizing environment.

TABLE 2

| Compound | $T_{melting}$ K | $T_{Tamman}$ K | $T_{Huttig}$ K |
| --- | --- | --- | --- |
| Rh | 2258 | 1129 | 677 |
| Pd | 1828 | 914 | 548 |
| Ru | 2723 | 1362 | 817 |
| $Rh_2O_3$ | 1373 | 687 | 412 |
| Pt | 2028 | 1014 | 608 |
| NiO | 2228 | 1114 | 669 |
| Ni | 1725 | 863 | 518 |

New catalytic systems must therefore be developed, which are capable of combining high conversions of the feedstock with high selectivities to CO and $H_2$ and low concentrations of unsaturated compounds.

The present invention relates to a new catalytic system whose objective is to combine a high catalytic activity (wherein by catalytic activity the applicant means a combination of the conversion of the reagents and selectivity to Synthesis Gas) with a reduced concentration of by-products, such as unsaturated compounds, which lead to the formation of carbonaceous deposits and/or soot. Said catalytic system comprises at least two catalytic zones always distinct and in contact with each other (called "differentiated catalytic bed"). From the process point of view, the catalytic zone through which the oxidizing stream first passes, must not contain Nickel as Nickel oxide would otherwise be formed.

An object of the present invention relates to a catalytic system comprising at least two catalytic zones of which at least one zone exclusively contains one or more noble metals selected from the group consisting of Rhodium, Ruthenium, Iridium, Palladium and Platinum and at least another zone contains Nickel, said catalytic system characterized in that at least one zone exclusively containing noble metals selected from the group consisting of Rhodium, Ruthenium, Iridium, Palladium and Platinum is always distinct but in contact with at least one zone containing Nickel.

A further object of the present invention relates to the catalytic system described above wherein one or more metals selected from the group consisting of Rhodium, Ruthenium, Iridium, Palladium and Platinum are possibly added to the catalytic zone or zones comprising Nickel.

The use of one or more noble metals selected from the group consisting of Rhodium, Ruthenium, Iridium, Palladium and Platinum offers the technical advantage of guaranteeing high and stable conversions of the feedstock and selectivity to synthesis gas; whereas the use of Nickel, possibly with the addition of one or more metals of the Platinum group, offers the technical advantage of effectively removing the unsaturated hydrocarbon compounds (for example ethylene) formed in the first catalytic system, which are precursors of PAHs and therefore soot. With the combined use of at least one type for each of the catalytic systems described above, an effluent is therefore produced with a high and stable concentration of carbon monoxide and hydrogen, and free of or, in any case, with a reduced content of ethylene and other unsaturated compounds, and all the by-products deriving therefrom, i.e. acetylene, PAH, carbonaceous deposits and/or soot, capable of causing malfunctioning in the catalysts and in the equipment positioned downstream of the production section of Synthesis Gas.

A further advantage of this invention is that Synthesis Gas is obtained with a significantly low percentage of unsaturated compounds also using high-molecular-weight hydrocarbon and/or oxygenated compounds and/or Natural Gas containing considerable quantities of $C_{2+}$, which can more easily give rise to unsaturated by-products, precursors of carbonaceous compounds. This improves the quality of the Synthesis Gas produced.

An important advantage deriving from the use of the catalytic system, object of the present invention, is the use of a smaller quantity of noble metal with the same catalytic performances, resulting in a significant reduction in the cost of the catalyst.

In this respect, the reduction in the quantity of noble metal necessary for the catalyst allows at least a partial disengagement from a critical and strategic commodity. Rhodium, for example, a metal which is mainly used in the SCT-CPO process, has an extremely volatile price as it is produced in small quantities and in few locations together with other noble metals such as Platinum, Palladium, Ruthenium and Iridium. Further objectives and advantages of the present invention will appear more evident from the following description and enclosed drawings, provided for pure illustrative and non-limiting purposes.

FIG. 1 is the Ellingham Diagram

Figure 2:
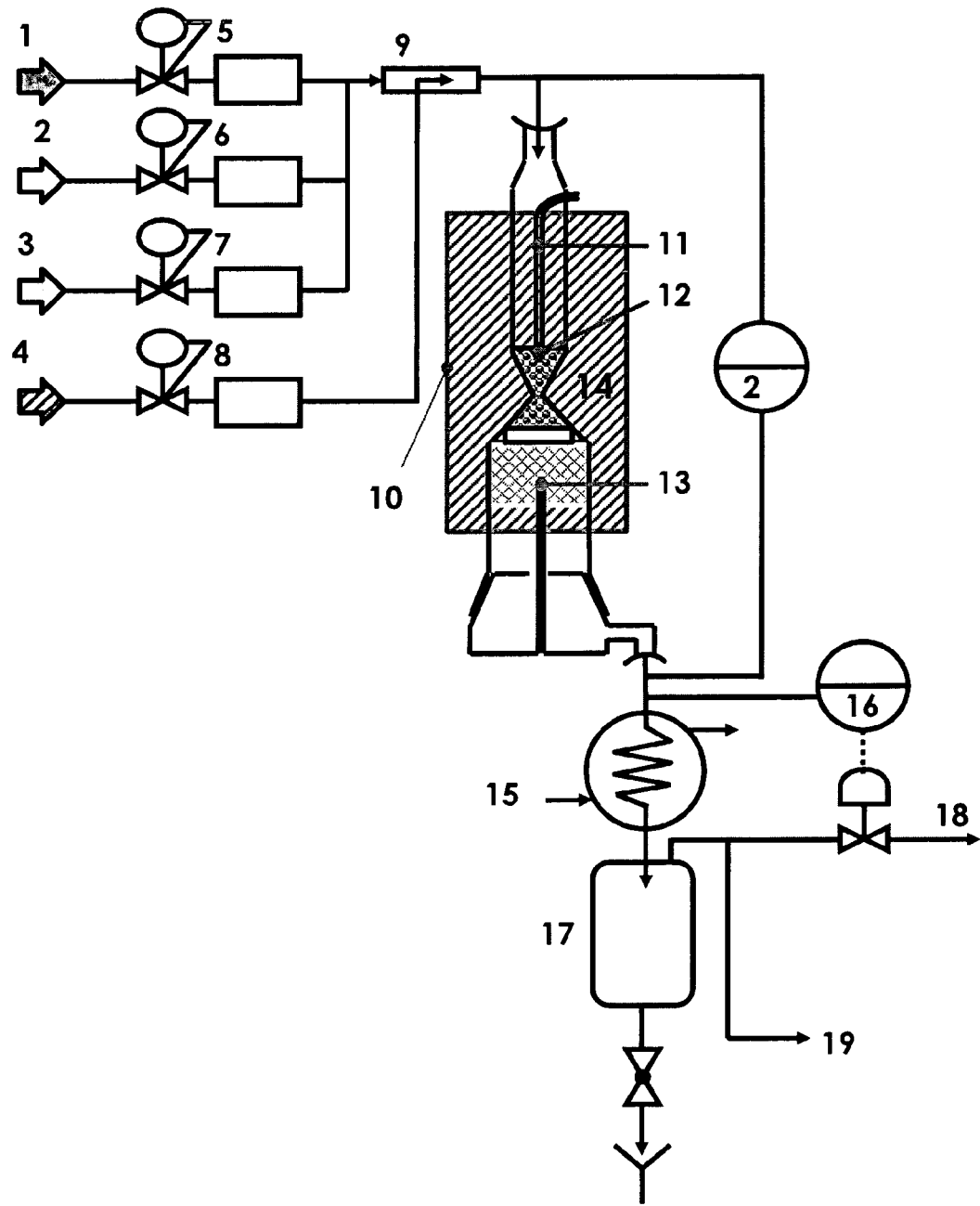

FIG. 2 is a scheme of the bench plant—laboratory scales, used for carrying out the catalytic tests described in Example 2 for the catalytic tests described in Examples 2A, 2B, 2C, 2D and 2E; wherein 1 is hydrogen, 2 is methane, 3 is nitrogen, 4 is air, 5, 6, 7 and 8 are mass flowmeters preceded by at least one pressure reducer, 9 is the mixing section, 11, 12 and 13 are thermocouples, 14 is the reaction section, 20 is a Differential Pressure Indicator, 15 is the water exchanger for cooling the reaction products, 16 is a Pressure Controller, 17 is a collection tank, 18 is the Blow-down collector, 19 is the analysis line which goes to the gaschromatograph. The preheater is not indicated in the figure.

Figure 3:
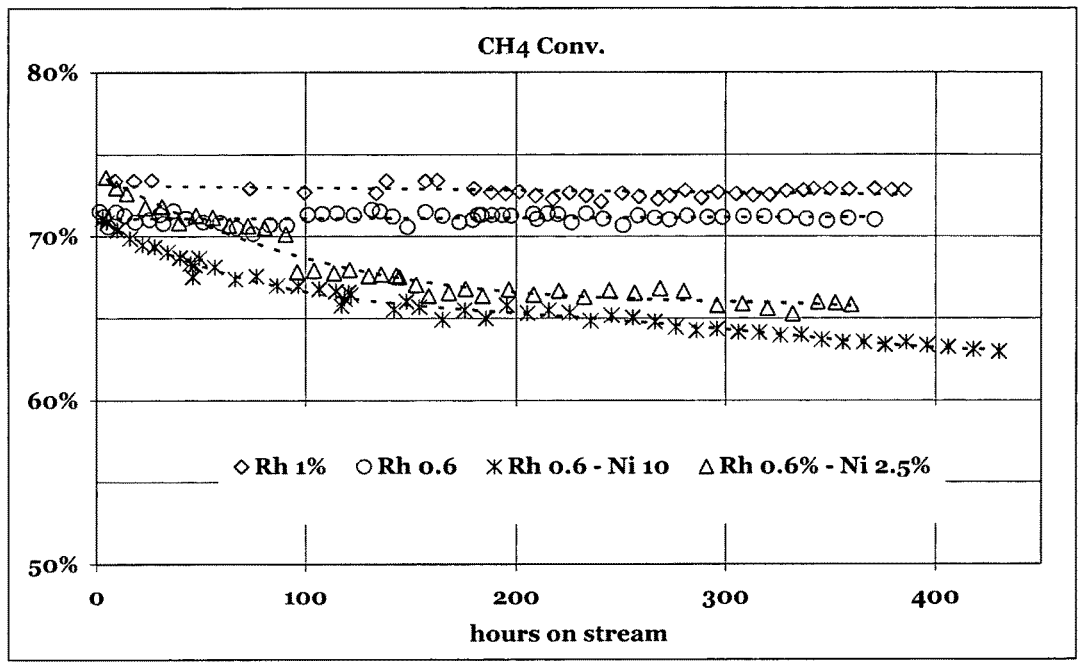
Figure 4:
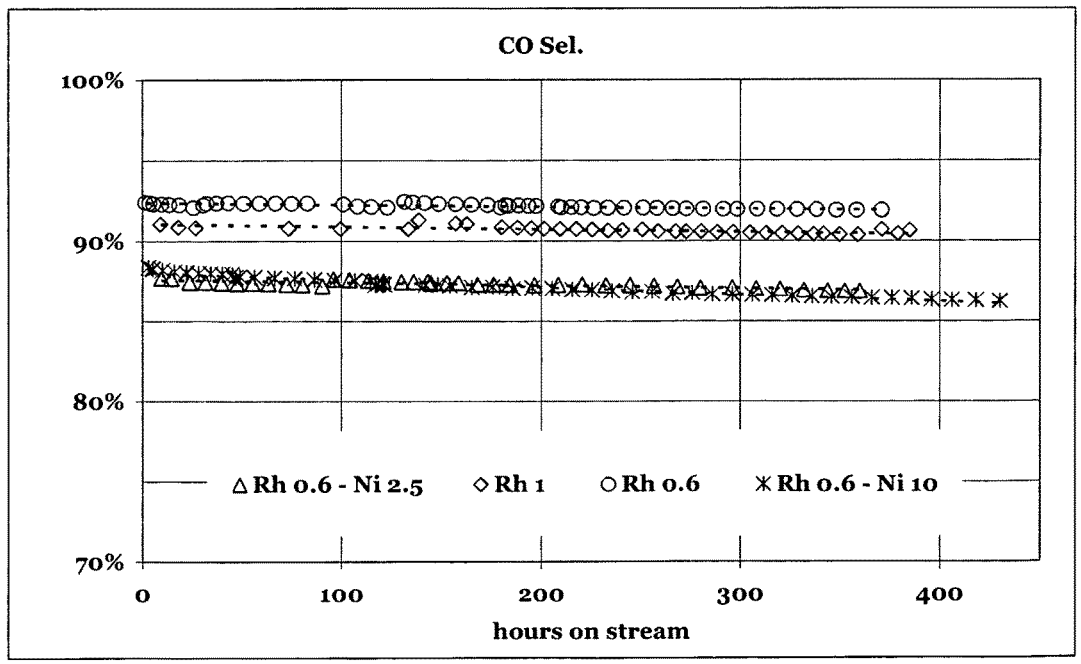
Figure 5:
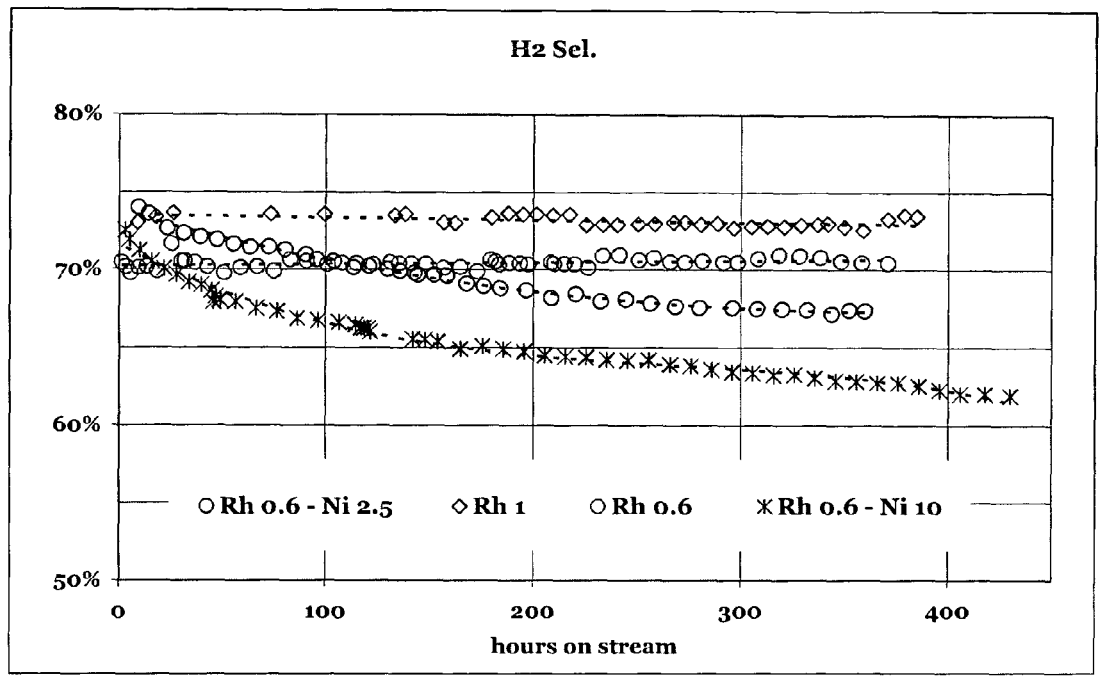

FIG. 3, FIG. 4 and FIG. 5 describe the conversion and selectivity trends of the tests illustrated in Examples 2A, 2B, 2C and 2D.

Figure 6:
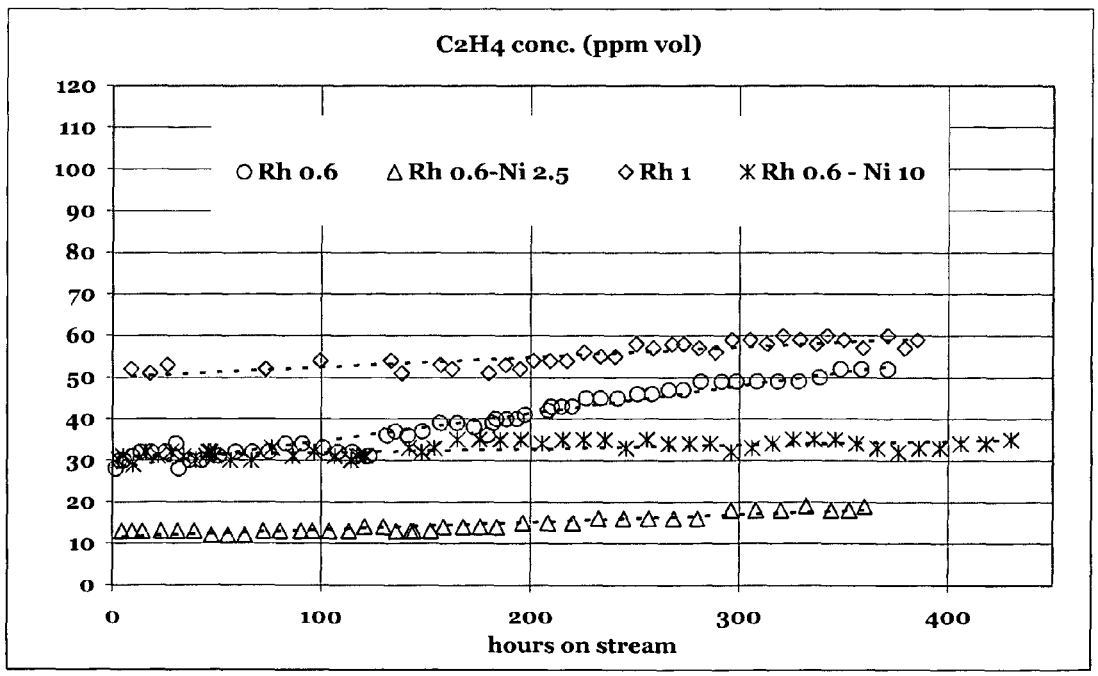
Figure 7:
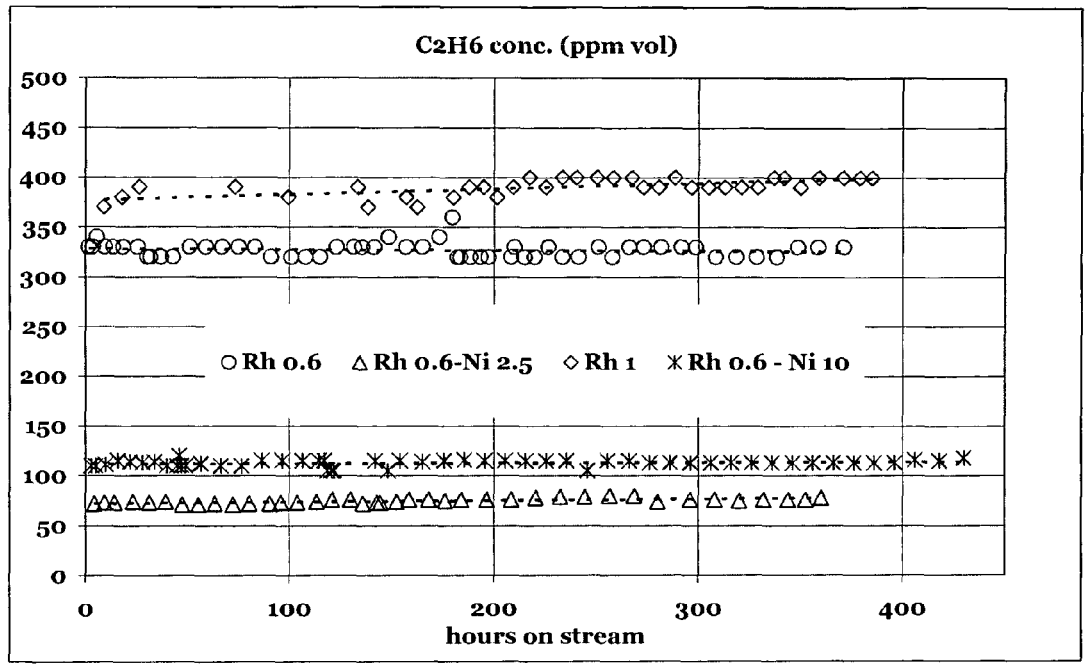
Figure 8:
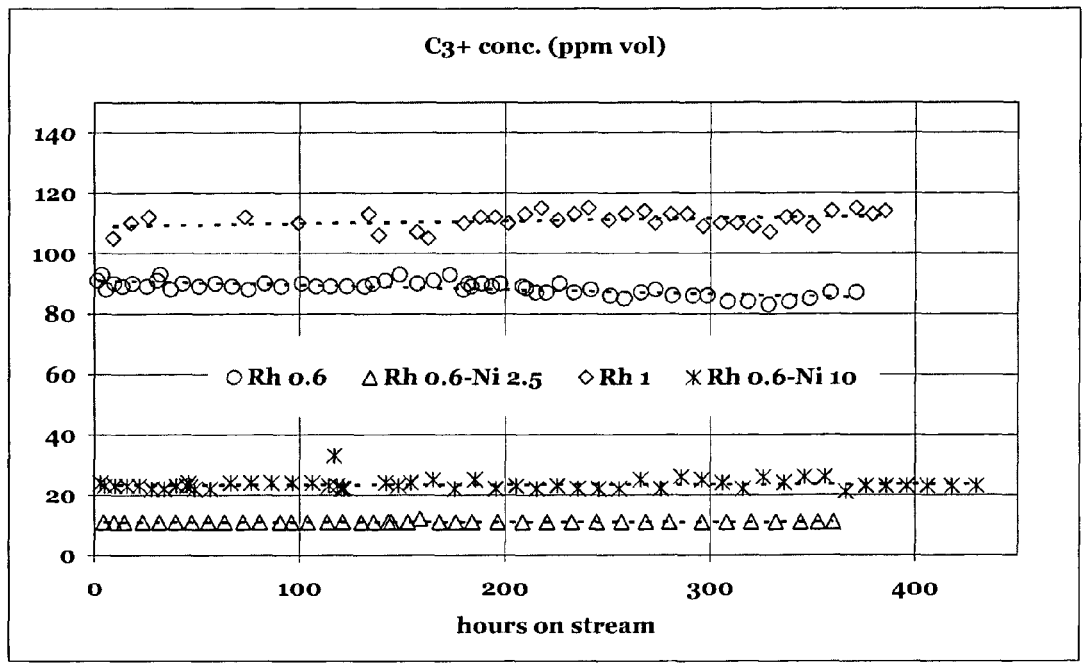

FIG. 6, FIG. 7 and FIG. 8 describe the concentration trends of the reaction by-products obtained from the tests illustrated in 2A, 2B, 2C and 2D.

Figure 9:
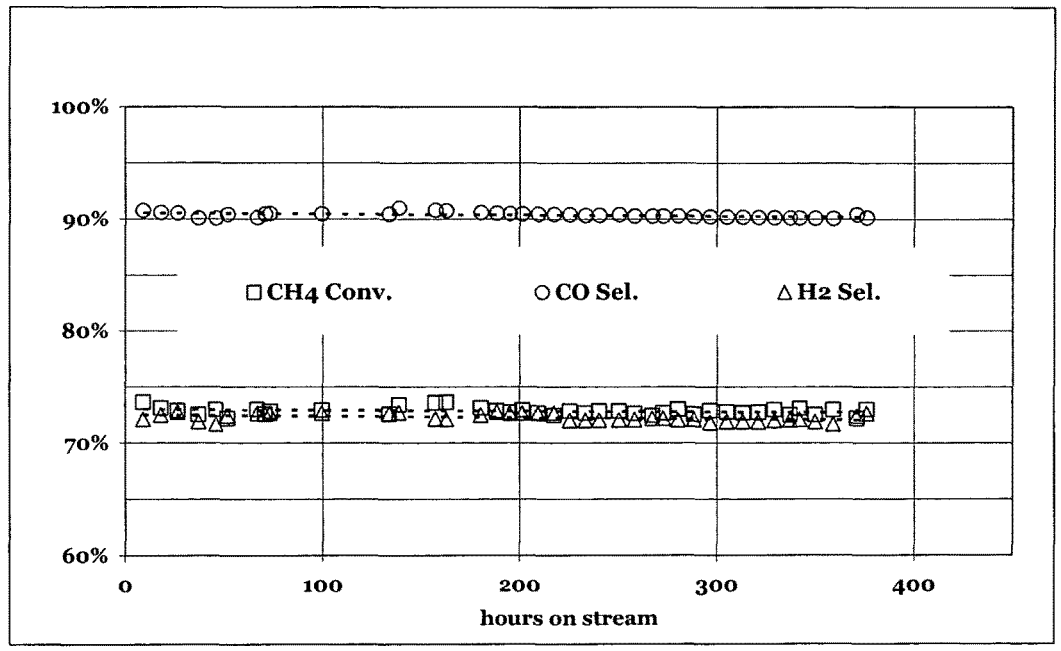
Figure 10:
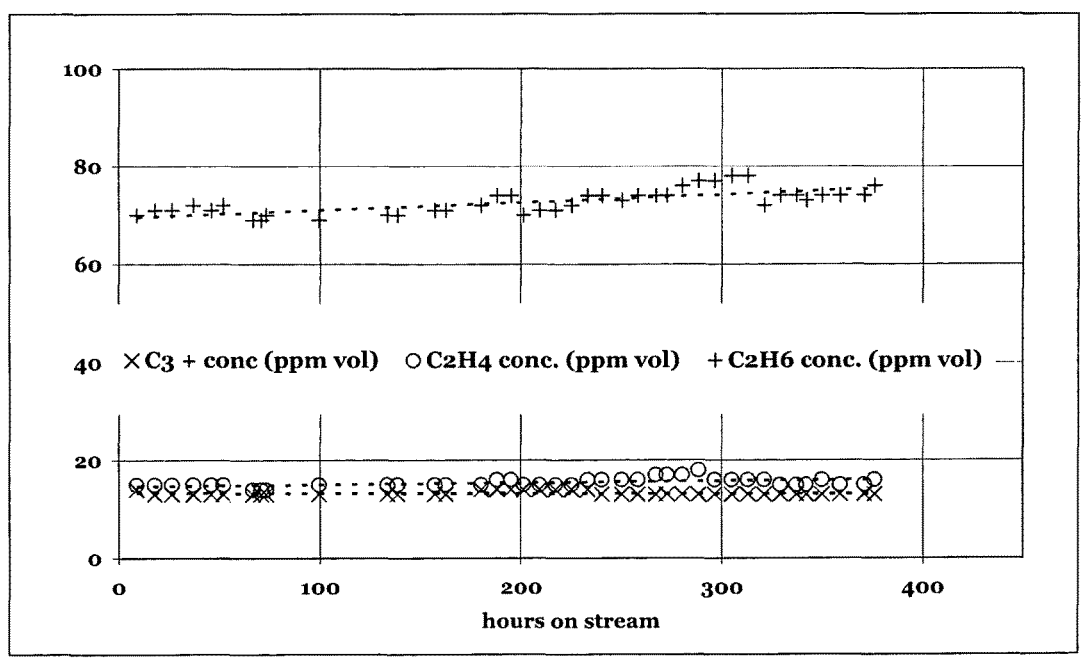

FIG. 9 and FIG. 10 illustrate the production trend of the hydrocarbon by-products according to what is described in Example 2E.

DETAILED DESCRIPTION

The product, object of the present invention is a particular catalytic system which allows a high catalytic activity to be combined with a reduced concentration of by-products responsible for the formation of carbonaceous deposits and/or soot. By catalytic activity, the applicant means the combination of conversion of the reagents and selectivity to Synthesis Gas.

The catalytic system, object of the present invention, comprises at least two distinct catalytic zones and always in contact with each other. Of these, at least one catalytic zone comprises one or more noble metals selected from the group consisting in Iridium, Rhodium, Ruthenium, Palladium and Platinum and must never contain Nickel, whereas at least one other zone includes Nickel, to which one or more noble metals selected from the group consisting of Iridium, Rhodium, Ruthenium, Palladium and Platinum have been possibly added. These catalytic zones are characterized in that at least one zone exclusively containing noble metals selected from the group consisting of Iridium, Rhodium, Ruthenium, Palladium and Platinum is always distinct but in contact with at least one zone containing Nickel. Among the noble metals, Rhodium is preferred. A zone of said catalytic system preferably comprises Rhodium and at least another zone includes Nickel.

As a whole, at least one of the catalytic zones must contain Nickel, and some catalytic zones may preferably also include catalysts comprising only noble metals selected from the group consisting of Iridium, Rhodium, Ruthenium, Palladium and Platinum, preferably Rhodium. The quantity of noble metal present in the catalytic system, object of the present invention, varies from 0.2% by weight to 10% by weight, preferably from 0.5% by weight to 2% by weight. The quantity of nickel present in the catalytic system, object of the present invention, varies from 0.5% by weight to 20% by weight, preferably from 2% by weight to 10% by weight.

Advantageously, the zones of said catalytic system can be positioned so as to form a catalytic bed, in which the layers of the bed are specifically the catalytic zones, object of the present invention. If the geometry of the reaction chamber included in the reaction equipment is truncated-conical, it is advisable for the height of the catalytic bed exclusively containing noble metals such as Rhodium, Ruthenium, Iridium, Palladium and Platinum to be at least ⅓ of the overall height of said bed. If, on the other hand, the geometry of the reaction equipment is tubular, then the minimum height of the catalytic bed can also be lower than ⅓ of the overall height of said bed. Various criteria are at the basis of the preselected catalytic system. First of all, no material containing Nickel can be included in the zone of the catalytic system which enters into contact with a stream comprising oxygen as it is incompatible. As can be deduced, in fact, by observing the Ellingham diagram (FIG. 1) which relates the formation of metallic oxides with the temperature and presence of oxygen from 0° C. to the melting point of metallic Nickel, the formation of Nickel oxide is thermodynamically favoured. Nickel is consequently unstable in an oxidizing environment and must therefore be exclusively positioned in the zone of the catalytic system in which there are the conditions which lead to the stability of this element in the metallic state, i.e. high temperatures, absence of oxygen and the presence of reducing agents such as CO and $H_2$. Secondly, the Nickel-based catalyst to which one or more metals of the Platinum group have been optionally added, is extremely effective in removing unsaturated compounds, but has a lower catalytic activity with respect to that of the catalyst based on at least one noble metal alone. Not only is the catalytic activity lower but it also tends to deteriorate as the reaction time proceeds. The catalytic system described is consequently designed so that a reagent and an oxidizing stream comprising air, enriched air or pure oxygen, after mixing, react in the zone of said catalytic system in the absence of Nickel and therefore exclusively containing noble metals selected from the group consisting of Iridium, Rhodium, Ruthenium, Palladium and Platinum.

The mixture begins to react in this catalytic zone, consuming all of the oxygen. The noble metals guarantee high and stable conversions and selectivity to Synthesis Gas. The partially reacted, oxygen-free mixture subsequently flows towards the other catalytic zones where the reactions which lead to the formation of Synthesis Gas in the absence of oxygen can be completed (endothermic Steam-Reforming and $CO_2$-Reforming reactions) and any possible unsaturated compounds formed in the first catalytic zone are removed. In this way, an effluent free of, or, in any case, with a reduced content of ethylene and other unsaturated compounds and all by-products deriving therefrom, i.e. acetylene, PAHs, carbonaceous deposits and/or soot, is produced.

The applicant has verified that catalytic systems containing Nickel are particularly effective in removing unsaturated compounds such as ethylene and other products. The catalytic systems containing Ni, however, even if one or more noble metals selected from the group consisting of Platinum, Iridium, Ruthenium, Palladium, Rhodium have been added, has lower catalytic performances than those obtained with a catalyst solely consisting of metals selected from those indicated above. Catalytic performances refer to the conversion values of the feedstock and selectivity to Synthesis Gas and their stability with time. The use of only one catalytic system is consequently unable to combine catalytic performances and the reduction/abatement of unsaturated compounds.

The metals forming the catalytic system, object of the present invention, are deposited with any technique of the known art. They are deposited, for example, using various impregnation methods, on carriers characterized by a high mechanical and thermal resistance coupled with chemical stability at temperatures of at least 1,200° C. Said carriers are preferably selected from oxides, nitrides, oxynitrides and carbides and metallic materials. The carrier can be in the form of pellets or structured. Structured carriers can be either ceramic or metallic, with foam-geometry, honeycomb-geometry or knitted wire-like geometry. A particularly suitable metal alloy is FeCrAlloy, which is suitably coated by means of a washcoating process with an oxide layer, on which active metals can be deposited. The pellets can have any geometrical shape (for example granules, also irregular, more or less regular spheres, cylinders, either full or perforated with one or more holes), whereas the dimensions are selected on the basis of the dimensions of the reaction equipment to be produced. The catalytic system, object of the present invention, can be used for short-contact-time catalytic partial oxidations of liquid and/or gaseous hydrocarbons.

The catalytic system, object of the present invention can be used in a short-contact-time catalytic partial oxidation process (SCT-CPO) for producing Synthesis Gas and possibly with further hydrogen passages starting from the following reagents:

hydrocarbons and/or oxygenated compounds liquid or gaseous at the inlet temperature and pressure of the reaction equipment, air, air enriched with oxygen in any volumetric percentage, from 21% to 100%, pure oxygen possibly steam and/or carbon dioxide;

The liquid hydrocarbons are selected from naphthas, diesel fuels, heavy diesel fuels such as Light Cycle Oils (LCO), and other products of oil refining and upgrading cycles, such as deasphalted oils (DAO).

The gaseous hydrocarbons are selected from methane, natural gas, refinery gas, liquefied petroleum gas and mixtures thereof. More preferably, the gaseous hydrocarbon feedstock consists of Natural Gas and refinery gas.

The oxygenated compounds, which can be liquid or gaseous at the inlet temperature and pressure of the reaction equipment, are selected from ethanol, ethylene glycol, fatty acid triglycerides, glycerine and carbohydrates having the general formula $C_n(H_2O)_nH_2$ and mixtures thereof. Glycerine obtained as by-product from the production processes of biofuels is preferably used as it is easily available but difficult to be adopted for other uses and therefore available at a low cost.

Said catalytic partial oxidation process comprises the following steps:

preheating the reagents to a temperature ranging from 25° C. to 350° C. and bringing said reagents to a pressure which ranges from 2 atm to 50 atm, premixing the reagents in one or more passages so as to form a homogeneous and possibly biphasic reagent mixture, reacting the reagent mixture thus obtained on said catalytic system, so that said mixture first encounters at least a catalytic zone including one or more noble metals selected from the group consisting of Rhodium, Ruthenium, Iridium, Palladium and Platinum, and so that the oxygen is totally consumed before said mixture encounters all the catalytic zones containing Nickel; at a reaction pressure which ranges from 2 atm to 50 atm, for a contact time ranging from 1 ms to 1,000 ms, at a space velocity ranging from 10,000 Nl/kg/h to 1,000,000 Nl/kg/h, so as to form Synthesis Gas at a maximum temperature of 1,200° C., cooling said Synthesis Gas to temperatures lower than 400° C. with contact times in the order of milliseconds, optionally reacting said Synthesis Gas according to a Water Gas Shift reaction to form a mixture enriched in carbon dioxide and hydrogen, optionally purifying said mixture so as to obtain a stream of pure hydrogen.

The reagents are preferably preheated so as to obtain a temperature at the inlet on the catalytic bed ranging from 100° C. to 350° C., even more preferably a temperature ranging from 200° C. to 350° C. The reaction pressure is preferably maintained at 10 atm to 30 atm. The contact time of the reagent mixture with the catalyst preferably ranges from 10 ms to 100 ms. The Synthesis Gas preferably exits at a maximum temperature of 1,150° C. The reagent mixture has a space velocity which preferably ranges from 20,000 Nl/kg/h to 200,000 Nl/kg/h. The reagents can possibly be subjected to any type of preheating treatment required. Some examples of desulfuration or hydrodesulfuration treatment are provided for illustrative purposes. If liquid reagents are fed at the inlet pressure and temperature, a device suitable for nebulizing/vaporizing the liquid streams is preferably used, such as that described for example in the patent WO 2006/034868 A1.

Both the transfer of the effluent coming from the reaction and also its cooling must take place rapidly, in a few milliseconds, to avoid undesired chemical reactions such as methanation [1] and disproportionation [2] indicated hereunder, $$CO+H_2=CH_4+H_2O \quad [1]$$

$$2CO=CO_2+C \quad [2]$$

favoured by temperatures ranging from 400° C. to 700° C., and cracking [3]

$$C_nH_m=nC+m/2H_2 \quad [3]$$

favoured by temperatures higher than 700° C., said reactions [1], [2] and [3] reduce the production of Synthesis Gas and lead to the formation of carbonaceous deposits.

The catalytic process, object of the present invention takes place in at least one reaction apparatus comprising:

a mixing section, a reaction chamber including:

at least two thermal shields, positioned respectively upstream and downstream of the catalytic system object of the present invention, the catalytic system object of the present invention, wherein the catalytic zones are arranged in such a way as to form a catalytic bed and wherein the catalytic zone including one or more noble metals selected from the group consisting of Rhodium, Ruthenium, Iridium, Palladium and Platinum, is in contact with and always precedes the catalytic zone containing Nickel, a cooling section of the reaction products.

The mixing of said reagents is effected in a mixing section which comprises a chamber having a cylindrical or truncated-conical form, designed so that the residence times of said reagents are shorter than the flame delay times, both depending on the composition of the reaction mixture and flow, pressure and temperature conditions, and that the linear rates of said reagents are higher than the flash rates.

This avoids light-off and flame back-propagation reactions from the catalytic bed and in general the triggering of radical reactions in gaseous phase.

In said equipment, the catalytic zones are arranged so as to form a catalytic bed in which at least one catalytic zone containing one or more noble metals selected from the group consisting of Rhodium, Ruthenium, Iridium, Palladium and Platinum, is in contact with and always precedes all the catalytic zones containing Nickel. The short contact-time catalytic partial oxidation process also comprises an inlet section of the liquid and/or gaseous reagents, which includes a compression section, a preheating section and possibly one or more pretreatment sections of the reagents (for example a desulfuration or hydrodesulfuration section is present for the removal of the sulfurated compounds). Furthermore, said process can possibly include one or more treatment phases of the Synthesis Gas produced, such as all the operations necessary for transforming the Synthesis Gas into the desired end-product. In the preferred case of a Hydrogen production plant, one or more Water-Gas Shift reactors and a Hydrogen Purification system are present.

The catalytic system, object of the present invention can be advantageously used in at least one reaction apparatus for producing Synthesis Gas by means a short-contact-time catalytic partial oxidation reaction. Said apparatuses each contain a mixing section and a reaction chamber including the catalytic system, object of the present invention, and at least two thermal shields. The catalytic zones inside said equipment can be arranged so as to form a catalytic bed in which at least one zone containing the noble metals (Rhodium, Ruthenium, Iridium, Palladium and Platinum), is in contact with and always precedes all zones containing Nickel. Upstream and downstream of the catalytic system, at least two thermal shields can be used, consisting of inert ceramic material in the form of granules, pellets, honeycomb or foams. The part of the apparatus, reaction chamber, which contains the catalytic bed is preferably cylindrical or truncated-conical or truncated-pyramidal. Furthermore, the generatrix of the development of the curved surface and the parallel to the vertical axis of the apparatus form an angle ranging from 5° to 65°, preferably from 10° to 45°. In the lower part of the apparatus there is a cooling zone of the Synthesis Gas produced.

Example 1

Synthesis

Example 1A 7.9 g of a solution of $Rh(NO_3)_3$ (12.5% wt. Rhodium) are diluted with demineralized water until a volume of 36.5 $cm^3$ of solution are obtained. 98.8 g of α-alumina balls having a diameter of 3 mm are impregnated, by means of the wet-impregnation technique, with the Rhodium solution previously prepared. The balls soaked in the metal solution are dried and calcined in a static muffle according to the following temperature profile:
50° C.→120° C., with a rate V=3° C./min
120° C.→120° C., for a time t=120 min
120° C.→750° C., with a rate V=3° C./min
750° C.→750° C., for a time t=120 min
750° C.→Room Temperature R.T. by free cooling.

After calcination, the solid has this nominal composition: $Rh_2O_3$ 1.2% wt. α-alumina 98.8% wt. The weight percentage of Rhodium (as metallic Rhodium) corresponds to 1% wt.

Example 1B 4.8 g of a solution of $Rh(NO_3)_3$ (12.5% wt. Rhodium) are diluted with demineralized water until a volume of 36.7 $cm^3$ of solution are obtained. 99.3 g of α-alumina balls having a diameter of 3 mm are impregnated, by means of the wet-impregnation technique, with the Rhodium solution previously prepared. The balls soaked in the metal solution are dried and calcined in a static muffle according to the following temperature profile:
50° C.→120° C., with a rate V=3° C./min
120° C.→120° C., for a time t=120 min
120° C.→750° C., with a rate V=3° C./min
750° C.→750° C., for a time t=120 min
750° C.→Room Temperature R.T. by free cooling.

After calcination, the solid has this nominal composition: $Rh_2O_3$ 0.7% wt. α-alumina 99.3% wt. The weight percentage of Rhodium (as metallic Rhodium) corresponds to 0.6% wt.

Example 1C 12.5 g of $Ni(NO_3)_2 6H_2O$ (purity 98.5% wt.) are added to 4.8 g of a solution of $Rh(NO_3)_3$ (12.5% wt. Rhodium); demineralized water is added to the mixture until a volume of 35.6 $cm^3$ of solution are obtained. 96.1 g of α-alumina balls having a diameter of 3 mm are impregnated, by means of the wet-impregnation technique, with the Rhodium solution previously prepared. The balls soaked in the metal solution are dried and calcined in a static muffle according to the following temperature profile:
50° C.→120° C., with a rate V=3° C./min
120° C.→120° C., for a time t=120 min
120° C.→750° C., with a rate V=3° C./min
750° C.→750° C., for a time t=120 min
750° C.→Room Temperature R.T. by free cooling.

After calcination, the solid has this nominal composition: $Rh_2O_3$ 0.7% wt., NiO 3.2% wt. and α-alumina 96.1% wt. The weight percentage of Rhodium (as metallic Rhodium) corresponds to 0.6% wt and that of Nickel (as metallic Nickel) corresponds to 2.5% wt.

Example 1D 24.8 g of $Ni(NO_3)_2 6H_2O$ (purity 98.5% wt.) are added to 4.8 g of a solution of $Rh(NO_3)_3$ (12.5% wt. Rhodium); demineralized water is added to the mixture until a volume of 34.4 $cm^3$ of solution are obtained. 93 g of α-alumina balls having a diameter of 3 mm are impregnated, by means of the wet-impregnation technique, with the Rhodium and Nickel solution previously prepared. The balls soaked in the metal solution are dried and calcined in a static muffle according to the following temperature profile:
50° C.→120° C., with a rate V=3° C./min
120° C.→120° C., for a time t=120 min
120° C.→750° C., with a rate V=3° C./min
750° C.→750° C., for a time t=120 min
750° C.→Room Temperature R.T. by free cooling.

After calcination, the solid has this nominal composition: $Rh_2O_3$ 0.7% wt., NiO 6.3% wt. and α-alumina 93% wt. The weight percentage of Rhodium (as metallic Rhodium) corresponds to 0.6% wt and that of Nickel (as metallic Nickel) corresponds to 10% wt.

Example 2

Catalytic Tests

The catalytic tests were carried out in a bench-scale plant (see FIG. 2), in which five main sections can be distinguished:
1. Feeding (1, 2, 3 and 4) and preheating of the reagents (not indicated in the figure),
2. Mixing (9),
3. Reaction (14),
4. Water cooling (15),
5. Analysis (19).

The reagents (1, 2, 3, 4) were preheated to a temperature of about 200° C., mixed with a "tube-in-tube" system (9) and sent to the reaction zone (14). The reactor is made of quartz, with a cylindrical geometry of the reaction zone and an internal diameter of 18 mm, and is inserted in an oven to provide the heat necessary for triggering the reaction and, once stationary conditions have been reached, for minimizing the heat loss. The synthesis gas produced was cooled in a water exchanger (15): an aliquot was collected for gaschromatographic analysis (19) and the remaining quantity was sent for blowdown treatment (18) after passage in the pressure regulation valve. The "Analysis" section comprises two stationary online GCs and an online microgaschromatograph, mainly used for following the transients in the start-up and shut-down phases. The catalyst was inserted between two thermal shields with a truncated-conical geometry, used for limiting the heat dispersions. The lower thermal shield, which additionally has the function of sustaining the catalytic bed, was cylindrically-shaped with a diameter of 40 mm and consisting of a cordierite disk, 12 mm high and a layer of $\alpha$-$Al_2O_3$ balls, 3 mm high. The upper thermal shield, on the other hand, consisted of a layer of $\alpha$-$Al_2O_3$ balls occupying a truncated-conical zone 19 mm high with an inlet diameter of 15 mm and an outlet diameter of 4 mm. In each test, the catalytic bed had a truncated-conical geometry, with a height of 18 mm, an inlet diameter of 4 mm and an outlet diameter of 40 mm. Two thermocouples positioned at 18 mm from the beginning of the catalytic bed and 19 mm from its end, respectively, allowed the temperature of the reagent mixture and effluent to be monitored.

Example 2A

Comparative

Four catalytic tests were effected, charging each time the same quantity of catalyst prepared in Examples 1A, 1B, 1C and 1D.
Each test was effected with the same procedure, i.e.:
one or more reaction start-ups, followed by correspondingly reaching stationary conditions and subsequent shut-downs,
after the last start-up, monitoring the catalytic activity for at least 200 consecutive hours.

The tests were effected at a pressure slightly higher than atmospheric pressure, feeding Methane (technical grade) and Air, in such quantities as to create an $O_2$/C ratio of 0.6 v/v. The space velocity used was 132,000 Nl/kg/h. The parameters used for evaluating the performances of a catalyst were the conversion of methane, the selectivity to synthesis gas and the selectivity to the by-products ethane, ethylene and other hydrocarbons higher than 2 (indicated with C3+). Furthermore, the oxygen consumption was calculated for each test (quotient of the volumetric quantity of reacted oxygen and volumetric quantity of synthesis gas effectively produced), an index that, as a whole, can summarize the trend of the test. The catalytic test described in this example was effected by charging about 3 g of the catalyst whose synthesis was described in Example 1A; the test lasted 393 hours. Five start-ups and four consecutive shut-downs were effected, which had no effect on the trend of the test: the conversion, selectivity (whose trends are indicated in the graphs of FIGS. 3, 4, 5) and oxygen consumption values are maintained stable for the whole running time.

Methane conversion: 72.7% (on a volumetric base)
Selectivity to CO: 90.7% (on a volumetric base)
Selectivity to $H_2$: 73.1% (on a volumetric base)
Oxygen consumption: 0.34 (on a volumetric base).

As far as the formation of by-products is concerned, their trend is indicated in the graphs of FIGS. 5, 6 and 7. With the catalyst at 1% by weight of Rhodium, the highest concentrations of hydrocarbon by-products were obtained. In particular, the concentration of ethylene was about 60 ppm on a volumetric base, that of ethylene about 400 and that of C3+ hydrocarbons 115. Furthermore the formation of each by-product is in constant, even if slight, increase.

Example 2B

The catalytic test described in this example was effected by charging about 3 g of the catalyst whose synthesis was described in Example 1B and had a duration of 371 hours.
Five start-ups and four consecutive shut-downs were effected. As in Example 2A, the conversion, selectivity (whose trends are indicated in the graphs of FIGS. 3, 4, 5) and oxygen consumption values were maintained stable for the whole running time.
Methane conversion: 71.6% (on a volumetric base)
Selectivity to CO: 92.1% (on a volumetric base)
Selectivity to $H_2$: 71.4% (on a volumetric base)
Oxygen consumption: 0.35 (on a volumetric base).

The concentration of ethylene had an increasing trend (see FIG. 6), from 30 to slightly over 40 ppm vol. The concentration of ethane was stable, but rather high (see FIG. 7), being equal to about 320 ppm vol. The concentration of C3+ hydrocarbons had a stable trend but its value is the second highest.

Example 2C

The catalytic test described in this example was effected by charging about 3 g of the catalyst whose synthesis was described in Example 1C and had a duration of 360 hours. Only one start-up procedure was effected. Of the results obtained with the monometallic catalysts, on the contrary, in which the metal is part of the platinum group, with the bimetallic catalyst (in this case Rh 0.6% wt. and Ni 2.5% wt.), the conversion values of methane and selectivity to Hydrogen decrease with the running hours (see FIGS. 3 and 5) whereas the selectivity to CO is relatively stable, but has a lower value (see FIG. 4).
At the end of the test, the final values of the evaluation parameters of the tests were:
Methane conversion: 65.8% (on a volumetric base)
Selectivity to CO: 86.9% (on a volumetric base)
Selectivity to $H_2$: 67.4% (on a volumetric base)
Oxygen consumption: 0.41 (on a volumetric base).

The concentrations of by-products are the lowest obtained and are characterized by fairly constant trends with time (see FIGS. 6, 7 and 8).

Example 2D

The catalytic test described in this example was effected by charging about 3 g of the catalyst whose synthesis was described in Example 1D and had a duration of 430 hours. Five start-ups and four consecutive shut-downs were effected.
As in Example 2C, also with this bimetallic catalyst (consisting of Rh 0.6% wt. and Ni 10% wt.), the conversion values of methane and selectivity to hydrogen are characterized by a decreasing trend and furthermore, the values obtained are the worst of the whole set of tests effected (see FIGS. 3 and 5). Analogously to Example 2C, the selectivity to CO is fairly stable and is also characterized by the same value (see FIG. 4).

At the end of the test, the final values of the evaluation parameters of the tests were:
Methane conversion: 63.0% (on a volumetric base)
Selectivity to CO: 86.2% (on a volumetric base)
Selectivity to $H_2$: 61.9% (on a volumetric base)
Oxygen consumption: 0.44 (on a volumetric base).

The concentrations of by-products have higher values if compared with those obtained by the bimetallic catalyst with a lower Nickel content, but in any case lower than those of the two monometallic catalysts. Furthermore, they have fairly constant trends with time (see FIGS. 6, 7 and 8).

Example 2E

The catalytic test described in this example was effected by charging about 1 g of the monometallic catalyst whose synthesis was described in Example 1A and about 2 g of the bimetallic catalyst whose synthesis was described in Example 1C.

The monometallic catalyst was positioned at the head of the catalytic bed, whereas the bimetallic catalyst was at the tail. The test lasted 377 hours. Five start-ups and four consecutive shut-downs were effected. On observing the graph indicated in FIG. 9, it can be noted that the trends of the methane conversion and selectivity to synthesis gas have a behaviour comparable to that which characterizes the performances obtained using the monometallic catalyst alone (see Example 2a and relative reference figures). More specifically, no deterioration in the catalytic activity is observed and the conversion/selectivity values are high:
Methane conversion: 73.0% (on a volumetric base)
Selectivity to CO: 90.1% (on a volumetric base)
Selectivity to $H_2$: 72.6% (on a volumetric base)
Oxygen consumption: 0.34 (on a volumetric base).

The production trend of hydrocarbon by-products, on the other hand, exactly reiterates the behaviour obtained using the bimetallic catalyst alone (see Example 2C and relative reference figures). The trend of the concentrations of ethane, ethylene and C3+ hydrocarbons is constant and the values are lower than those obtained with the monometallic catalysts (see FIG. 10).

The invention claimed is:

1. A catalytic system, comprising:
a first catalytic zone comprising at least one noble metal selected from the group consisting of Rhodium, Ruthenium, Iridium, Palladium, and Platinum; and
a second catalytic zone comprising Nickel and at least one metal selected from the group consisting of Rhodium, Ruthenium, Iridium, Palladium, and Platinum,
wherein the first catalytic zone is distinct but in contact with the second catalytic zone comprising Nickel and at least one metal selected from the group consisting of Rhodium, Ruthenium, Iridium, Palladium, and Platinum, and
said first catalytic zone does not contain Nickel.

2. The catalytic system of claim 1, wherein the second catalytic zone comprises Palladium or Platinum.

3. The catalytic system of claim 1, wherein the first catalytic zone comprises Rhodium and the second catalytic zone comprises Nickel and Rhodium.

4. The catalytic system of claim 2, wherein the first catalytic zone, the second catalytic zone, or both comprise Rhodium.

5. The catalytic system of claim 1, wherein the first and second catalytic zones are arranged to form a catalytic bed.

6. The catalytic system of claim 1, wherein the noble metal amount ranges from 0.2% to 10% weight, with respect to the total catalyst weight.

7. The catalytic system of claim 6, wherein the noble metal amount ranges from 0.5% to 2% weight, with respect to the total catalyst weight.

8. The catalytic system of claim 1, wherein the Nickel amount ranges from 0.5% to 20% weight, with respect to the total catalyst weight.

9. The catalytic system of claim 8, wherein the Nickel amount ranges from 2% to 10% weight, with respect to the total catalyst weight.

10. The catalytic system of claim 5, wherein each of said first catalytic zone and said second catalytic zone is in the form of metallic pellets, wherein each of said at least one noble metal and said Nickel is supported on spheres of α-alumina.

11. The catalytic system of claim 1, wherein the noble metal amount ranges from 0.2% to 10% weight, with respect to the total catalyst weight, and the Nickel amount ranges from 0.5% to 20% weight, with respect to the total catalyst weight.

12. The catalytic system of claim 1, wherein the noble metal amount ranges from 0.5% to 2% weight, with respect to the total catalyst weight, and the Nickel amount ranges from 2% to 10% weight, with respect to the total catalyst weight.

13. The catalytic system of claim 3, wherein the Rhodium amount ranges from 0.2% to 10% weight, with respect to the total catalyst weight, and the Nickel amount ranges from 0.5% to 20% weight, with respect to the total catalyst weight.

14. The catalytic system of claim 3, wherein the Rhodium amount ranges from 0.5% to 2% weight, with respect to the total catalyst weight, and the Nickel amount ranges from 2% to 10% weight, with respect to the total catalyst weight.

15. The catalytic system of claim 10, wherein the noble metal amount ranges from 0.2% to 10% weight, with respect to the total catalyst weight, and the Nickel amount ranges from 0.5% to 20% weight, with respect to the total catalyst weight.

16. The catalytic system of claim 10, wherein the noble metal amount ranges from 0.5% to 2% weight, with respect to the total catalyst weight, and the Nickel amount ranges from 2% to 10% weight, with respect to the total catalyst weight.

17. The catalytic system of claim 15, wherein the first catalytic zone comprises Rhodium and the second catalytic zone comprises Nickel and Rhodium.

18. The catalytic system of claim 16, wherein the first catalytic zone comprises Rhodium and the second catalytic zone comprises Nickel and Rhodium.

* * * * *